United States Patent
Al-Yousif et al.

(10) Patent No.: US 12,523,132 B2
(45) Date of Patent: Jan. 13, 2026

(54) ENHANCED OIL RECOVERY

(71) Applicant: Saudi Arabian Oil Company, Dhahran (SA)

(72) Inventors: Zuhair Al-Yousif, Saihat (SA); Ming Han, Dhahran (SA); Tianping Huang, Beijing (CN); Shaohua Chen, Beijing (CN)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/439,583

(22) Filed: Feb. 12, 2024

(65) Prior Publication Data

US 2025/0257640 A1    Aug. 14, 2025

(51) Int. Cl.
E21B 43/16    (2006.01)
C09K 8/584    (2006.01)
C09K 8/594    (2006.01)

(52) U.S. Cl.
CPC ............ E21B 43/164 (2013.01); C09K 8/584 (2013.01); C09K 8/594 (2013.01)

(58) Field of Classification Search
CPC ........ C09K 8/584; C09K 8/594; C09K 8/602; E21B 43/164; E21B 43/16; E21B 33/138; E21B 43/255; E21B 2200/20; E21B 43/162; E21B 43/25

See application file for complete search history.

(56) References Cited

U.S. PATENT DOCUMENTS

| | | |
|---|---|---|
| 9,862,882 B2 | 1/2018 | Huang et al. |
| 11,993,747 B1 | 5/2024 | Al-Yousif et al. |
| 2008/0318812 A1* | 12/2008 | Kakadjian, Sr. ......... C09K 8/64 507/221 |
| 2010/0048432 A1 | 2/2010 | Costello et al. |
| 2016/0257879 A1 | 9/2016 | Huang et al. |
| 2019/0330518 A1 | 10/2019 | Dai et al. |
| 2020/0131431 A1 | 4/2020 | Russum |
| 2022/0204835 A1 | 6/2022 | Nguyen et al. |
| 2023/0184072 A1* | 6/2023 | Al-Qasim ............. E21B 43/003 166/252.1 |

OTHER PUBLICATIONS

AlYousef et al., "Direct Thickening of Supercritical Carbon Dioxide Using $CO_2$-Soluble Polymer," presented at the Abu Dhabi International Petroleum Exhibition & Conference, Abu Dhabi, UAE, Nov. 11-14, 2019, 11 pages.
Carpenter, "Development of Small Molecule $CO_2$ Thickeners," Journal of Petroleum Technology, Jul. 2014, 3 pages.
(Continued)

*Primary Examiner* — Zakiya W Bates
(74) *Attorney, Agent, or Firm* — Fish & Richardson P.C.

(57) ABSTRACT

A mixture of an anionic surfactant and an amine is injected into a high permeability zone of a subterranean formation. Gaseous $CO_2$ is injected through the wellbore into the high permeability zone to increase the viscosity of the injected mixture to prevent gravity override of the injected $CO_2$. After increasing the viscosity of the mixture, $CO_2$ is injected through the wellbore into a low permeability zone to recover the hydrocarbons.

22 Claims, 5 Drawing Sheets

(56) References Cited

OTHER PUBLICATIONS

Gizzatov et al., "High-Temperature High-Pressure Microfluidic System for Rapid Screening of Supercritical $CO_2$ Foaming Agents," Scientific Reports, Feb. 2021, 13 pages.
Heller et al., "Direct Thickeners for Mobility Control of $CO_2$ Floods," Society of Petroleum Engineers Journal, Oct. 1985, 8 pages.
Lee et al., "Development of Small Molecule $CO_2$ Thickeners for EOR and Fracturing," presented at the SPE Improved Oil Recovery Symposium, Tulsa, Oklahoma, Apr. 12-14, 2014, 18 pages.
Li et al., "$CO_2$-Triggered Gelation for Mobility Control and Channeling Blocking During $CO_2$ Flooding Processes," Petroleum Science, May 2016, 13:247-58, 11 pages.
Li et al., "Leakage Mitigation During $CO_2$ Geological Storage Process Using $CO_2$ Triggered Gelation," Industrial & Engineering Chemical Research, Feb. 2019, 58(8):3395-406, 2 pages.
Massarweh et al., "A Review of Recent Developments in $CO_2$ Mobility Control in Enhanced Oil Recovery," Petroleum, May 2021, 8:291-317, 27 pages.
Syed et al., "The Use of Polymer-Gel Solutions for Remediation of Potential $CO_2$ Leakage from Storage Reservoirs," Energy Procedia, Jan. 2014, 8 pages.

\* cited by examiner

ENHANCED OIL RECOVERY

TECHNICAL FIELD

The present disclosure relates to methods for enhanced oil recovery (EOR) from a subterranean formation including injecting a mixture of an anionic surfactant and an amine into a high-permeability zone of the formation, followed by injecting $CO_2$, to reduce $CO_2$ mobility in the high-permeability zone.

BACKGROUND

Enhanced oil recovery (EOR) enables the extraction of hydrocarbon reserves that conventional primary and secondary recovery processes cannot access. EOR may be accomplished by any of several different techniques that each involve pumping a flooding agent into an oil-bearing formation to move the petroleum to exit wells. Water is most often used as the flooding agent; however intimate contact between petroleum and water creates cross-contamination that mandates remediation of large volumes of organic-contaminated water.

Another prominent EOR technique applied in oil fields is injection of hydrocarbon and/or non-hydrocarbon gases, such as carbon dioxide ($CO_2$) and nitrogen ($N_2$). $CO_2$, which is inexpensive, non-flammable, and non-toxic, has been extensively employed to recover oil from subterranean formations. However, $CO_2$ injection can yield insufficient oil recovery, due to the density and viscosity of the injected $CO_2$. The low density of $CO_2$ compared to oil, even under high pressure, can result in $CO_2$ gravity override, which reduces oil recovery at the lower parts of the reservoir. Additionally, the viscosity of liquid $CO_2$ and super-critical $CO_2$ at normal reservoir conditions is much less than in-situ oil and brine, which can lead to poor areal sweep and gas channeling. In such circumstances, $CO_2$ injection leaves less permeable zones unswept and, accordingly, a portion of the reserve unrecovered.

Therefore, there is a need for improved $CO_2$ injection EOR methods.

SUMMARY

Provided in the present disclosure is a method of enhanced oil recovery (EOR) from a subterranean formation including a high-permeability zone and a low permeability zone. The method includes injecting, through a wellbore into the high-permeability zone, a mixture comprising an anionic surfactant and an amine and having a viscosity of less than about 0.01 Pa·s at a shear rate from about 0.1 to about 1000 $s^{-1}$, and injecting $CO_2$ through the wellbore into the high-permeability zone to increase a viscosity of the mixture in the high-permeability zone. Increasing the viscosity of the mixture reduces a mobility of $CO_2$ in the high-permeability zone. The method further includes injecting $CO_2$ through the wellbore into the low-permeability zone to stimulate a flow of hydrocarbons from the low-permeability zone.

Also provided in the present disclosure is a method of EOR from a subterranean formation including a high-permeability zone and a low permeability zone. The method includes expanding an upper seal of the straddle packer above the high-permeability zone and expanding a lower seal of the straddle packer below the high-permeability zone to mechanically isolate the high-permeability zone, injecting a mixture comprising an anionic surfactant and an amine through the straddle packer into the high-permeability zone, and injecting $CO_2$ through the wellbore into the high-permeability zone to increase a viscosity of the mixture in the high-permeability zone. Increasing the viscosity of the mixture reduces a mobility of $CO_2$ in the high-permeability zone. The method further includes removing the straddle packer from the wellbore after increasing the viscosity of the mixture, and injecting $CO_2$ through the wellbore into the low-permeability zone to stimulate a flow of hydrocarbons from the low-permeability zone.

DETAILED DESCRIPTION

The present disclosure relates to methods for enhanced oil recovery (EOR) from a subterranean formation, for example, a heterogeneous subterranean formation including a high-permeability zone. The methods of the present disclosure include injecting a low-viscosity mixture including an anionic surfactant and an amine through a wellbore into a high-permeability zone, and then injecting $CO_2$ through the wellbore into the high-permeability zone. Injecting the $CO_2$ can trigger gelation of the mixture in the high-permeability zone. The increased viscosity of the mixture after $CO_2$ injection can reduce $CO_2$ mobility in the high-permeability zone, allowing production of hydrocarbons from low-permeability zones of the subterranean formation. Such low-permeability zones can include regions of the subterranean formation unswept by previous gas or liquid injections, for example, resulting from gravity override or viscous fingering of previously injected gas or liquid. Additionally, because injected $CO_2$ can be sequestered in the gelled mixture, the methods described in the present disclosure can reduce atmospheric $CO_2$.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods of the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "substituted" means that an atom or group of atoms formally replaces hydrogen as a "substituent" attached to another group. The term "substituted", unless otherwise indicated, refers to any level of substitution, for example, mono-, di-, tri-, tetra- or penta-substitution, where such substitution is permitted. The substituents are independently selected, and substitution may be at any chemically accessible position. It is to be understood that substitution at a given atom is limited by valency. It is to be understood that substitution at a given atom results in a chemically stable molecule. The phrase "optionally substituted" means unsubstituted or substituted. The term "substituted" means that a hydrogen atom is removed and replaced by a substituent. A single divalent substituent, for example, oxo, can replace two hydrogen atoms.

As used in the present disclosure, the term "$C_{n-m}$" indicates a range which includes the endpoints, wherein n and m are integers and indicate the number of carbons. Examples include $C_{1-4}$, $C_{1-6}$ and the like.

As used in the present disclosure, the term "n-membered," where n is an integer, indicates the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring and 1,2,3,4-tetrahydro-naphthalene is an example of a 10-membered cycloalkyl group.

As used in the present disclosure, the term "alkyl" refers to a saturated hydrocarbon group that may be straight-chained or branched. In some embodiments, the alkyl group contains from 1 to 6 carbon atoms, from 1 to 4 carbon atoms, from 1 to 3 carbon atoms, or 1 to 2 carbon atoms. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like.

As used in the present disclosure, the term "alkylene," refers to a divalent alkyl linking group. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl and the like.

As used in the present disclosure, the term "alkenyl," refers to a straight-chain or branched hydrocarbon group corresponding to an alkyl group having one or more double carbon-carbon bonds. In some embodiments, the alkenyl moiety contains 2 to 6, 2 to 4, or 2 to 3 carbon atoms. Example alkenyl groups include, but are not limited to, ethenyl, n-propenyl, isopropenyl, n-butenyl, sec-butenyl and the like.

As used in the present disclosure, the term "cycloalkyl" refers to a non-aromatic hydrocarbon ring system (monocyclic, bicyclic or polycyclic), including cyclized alkyl and alkenyl groups. Cycloalkyl groups can include mono- or polycyclic (for example, having 2, 3 or 4 fused rings) groups and spirocycles. Cycloalkyl groups can have 3, 4, 5, 6 or 7 ring-forming carbons ($C_{3-7}$). In some embodiments, the cycloalkyl group has 3 to 6 ring members, 3 to 5 ring members, or 3 to 4 ring members. In some embodiments, the cycloalkyl group is monocyclic. In some embodiments, the cycloalkyl group is monocyclic or bicyclic. In some embodiments, the cycloalkyl group is a $C_{3-6}$ monocyclic cycloalkyl group. Ring-forming carbon atoms of a cycloalkyl group can be optionally oxidized to form an oxo or sulfido group. Cycloalkyl groups also include cycloalkylidenes. In some embodiments, cycloalkyl is cyclopropyl, cyclobutyl, cyclopentyl or cyclohexyl. Also included in the definition of cycloalkyl are moieties that have one or more aromatic rings fused (having a bond in common with) to the cycloalkyl ring, for example, benzo or thienyl derivatives of cyclopentane, cyclohexane and the like. A cycloalkyl group containing a fused aromatic ring can be attached through any ring-forming atom including a ring-forming atom of the fused aromatic ring. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, bicyclo[1.1.1]pentanyl, bicyclo[2.1.1]hexanyl, and the like. In some embodiments, the cycloalkyl group is cyclopropyl, cyclobutyl, cyclopentyl, or cyclohexyl.

As used in the present disclosure, he term "$C_{n-m}$aryl" refers to an aryl group having from n to m ring carbon atoms. Aryl groups include phenyl, naphthyl, indanyl, indenyl, and the like. In some embodiments, aryl groups have from 6 to 10 carbon atoms. In some embodiments, aryl groups have 6 carbon atoms. In some embodiments aryl groups have 10 carbon atoms. In some embodiments, the aryl group is phenyl. In some embodiments, the aryl group is naphthyl.

The term "heterocycloalkyl," employed alone or in combination with other terms, refers to a non-aromatic ring or ring system, which may optionally contain one or more alkenylene groups as part of the ring structure, which has at least one heteroatom ring member independently selected from nitrogen, sulfur oxygen and phosphorus, and which has 4-10 ring members, 4-7 ring members, or 4-6 ring members. Included within the term "heterocycloalkyl" are monocyclic 4-, 5-, 6- and 7-membered heterocycloalkyl groups. Heterocycloalkyl groups can include mono- or bicyclic (for example, having two fused or bridged rings) ring systems. In some embodiments, the heterocycloalkyl group is a monocyclic group having 1, 2 or 3 heteroatoms independently selected from nitrogen, sulfur and oxygen. Ring-forming carbon atoms and heteroatoms of a heterocycloalkyl group can be optionally oxidized to form an oxo or sulfido group or other oxidized linkage (for example, C(O), S(O), C(S) or $S(O)_2$, N-oxide etc.) or a nitrogen atom can be quaternized. The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (having a bond in common with) to the heterocycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. Examples of heterocycloalkyl groups include azetidinyl, azepanyl, dihydrobenzofuranyl, dihydrofuranyl, dihydropyranyl, morpholino, 3-oxa-9-azaspiro[5.5]undecanyl, 1-oxa-8-azaspiro[4.5]decanyl, piperidinyl, piperazinyl, oxopiperazinyl, pyranyl, pyrrolidinyl, quinuclidinyl, tetrahydrofuranyl, tetrahydropyranyl, 1,2,3,4-tetrahydroquinolinyl, tropanyl, and thiomorpholino.

As used in the present disclosure, the term "heteroaryl" refers to a monocyclic or polycyclic aromatic heterocycle having at least one heteroatom ring member selected from sulfur, oxygen and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-14 ring atoms including carbon atoms and 1, 2, 3, or 4 heteroatom ring members independently selected from nitrogen, sulfur and oxygen. In some embodiments, the heteroaryl has 5-10 ring atoms including carbon atoms and 1, 2, 3, or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membered heteroaryl ring. In other embodiments, the heteroaryl is an eight-membered, nine-membered or ten-membered fused bicyclic heteroaryl ring. Example heteroaryl groups include, but are not limited to, pyridinyl (pyridyl), pyrimidinyl, pyrazinyl, pyridazinyl, pyrrolyl, pyrazolyl, azolyl, oxazolyl, thiazolyl, imidazolyl, furanyl, thiophenyl, quinolinyl, isoquinolinyl, naphthyridinyl (including 1,2-, 1,3-, 1,4-, 1,5-, 1,6-, 1,7-, 1,8-, 2,3- and 2,6-naphthyridine), indolyl, benzothiophenyl, benzofuranyl, benzisoxazolyl, imidazo[1,2-b]thiazolyl, purinyl, and the like.

The term "n-membered," where n is an integer, typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring and 1,2,3,4-tetrahydro-naphthalene is an example of a 10-membered cycloalkyl group.

As used in the present disclosure, the term "halo" refers to —F, —Cl, —Br, or -.

As used in the present disclosure, the term "hydroxyl" refers to —OH.

As used in the present disclosure, the term "amino" refers to —$NR^{N1}R^{N2}$, where each of $R^{N1}$ and $R^{N2}$ is independently H or $C_{1-4}$ alkyl.

As used in the present disclosure, the term "thiol" refers to —SH.

As used in the present disclosure, the term "oxo" refers to =O.

As used in the present disclosure, the term "carboxylate surfactant" refers to a compound having the formula R—C(O)O$^-$X$^+$, in which R is a hydrophobic group and X$^+$ is a cationic moiety having a formal charge of 1. For example, R can be an alkyl group.

As used in the present disclosure, the term "sulfate surfactant" refers to a compound having the formula R—OS$(O)_2$O$^-$X$^+$, in which R is a hydrophobic group and X$^+$ is a cationic moiety having a formal charge of 1. For example, R can be an alkyl group.

As used in the present disclosure, the term "sulfonate surfactant" refers to a compound having the formula R—S$(O)_2$O$^-$X$^+$, in which R is a hydrophobic group and X$^+$ is a cationic moiety having a formal charge of 1. For example, R can be an alkyl group.

As used in the present disclosure, the term "alkyl alcohol ether" refers to a hydrophobic group having the formula $R^1$—O—$(R^2$—O$)_n$—, in which $R^1$ and $R^2$ are alkyl and n is an integer of 1 or greater. For example, the alkyl alcohol ether can be an alkyl alcohol polyoxyethylene group, where $R^2$ is $C_2$ alkyl.

As used in the present disclosure, the term "alkylene diamine" refers to a compound including two amino groups linked by an alkylene group. For example, the alkylene group can be a $C_2$ alkylene group.

As used in the present disclosure, the term "alkylene triamine" refers to a compound including three amino groups linked by two alkylene groups. In some embodiments, the alkylene groups are the same. For example, the alkylene group can be a $C_6$ alkylene group.

As used in the present disclosure, the term "alkanolamine" refers to a compound including an amino group and a hydroxyl group linked by an alkylene group. For example, the alkylene group can be a $C_2$ alkylene group.

As used in the present disclosure, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith.

As used in the present disclosure, the term "high-permeability zone" refers to a region of a subterranean formation in which $CO_2$ mobility is greater as compared to one or more other regions of the subterranean formation. For example, high permeability zones can include shallower regions of a subterranean formation due to gravity override, gas channels through a subterranean formation due to viscous fingering, or both. High permeability zones can also include regions of a subterranean formation having greater porosity, larger pore sizes, or both, and fractures in the subterranean formation that provide a flow path therethrough.

As used in the present disclosure, the term "low-permeability zone" refers to a region of a subterranean formation in which $CO_2$ mobility is less as compared to one or more high-permeability zones of the subterranean formation. Low permeability zones can include, for example, unswept regions of a subterranean formation remaining after conventional water or gas injection methods.

Anionic Surfactant

The methods of the present disclosure including injecting a mixture including an anionic surfactant through a wellbore into a high-permeability zone. In some embodiments, the anionic surfactant includes a carboxylate surfactant, a sulfonate surfactant, a sulfate surfactant, or any combination thereof.

In some embodiments, the anionic surfactant includes an alkyl group or an alkenyl group. In some embodiments, the anionic surfactant includes a $C_{12-22}$ alkyl group or a $C_{12-22}$ alkenyl group. In certain such embodiments, the anionic surfactant includes a $C_{12}$, $C_{14}$, $C_{16}$, $C_{18}$, $C_{20}$, or $C_{22}$ alkyl group, or a $C_{12}$, $C_{14}$, $C_{16}$, $C_{18}$, $C_{20}$, or $C_{22}$ alkenyl group. In some embodiments, the anionic surfactant includes a sulfate surfactant including a $C_{12-22}$ alkyl group. For example, in some embodiments, the anionic surfactant includes sodium dodecyl sulfate, sodium tetradecyl sulfate, sodium hexadecyl sulfate, sodium octadecyl sulfate, or any combination thereof.

In some embodiments, the anionic surfactant includes an alkyl alcohol ether group. In some embodiments, the anionic surfactant includes an alkyl alcohol polyoxyethylene group. In certain such embodiments, the anionic surfactant includes a $C_{12-22}$ alkyl alcohol polyoxyethylene group. In some embodiments, the alkyl alcohol polyoxyethylene group has a degree of ethoxylation from about 0.5 to about 10, for example, from about 0.5 to about 7, or from about 1 to about 5.

In some embodiments, the anionic surfactant includes a compound of Formula I, Formula II, or Formula III:

(I)

(II)

(III)

wherein:
$R^1$ is the sum of m and q is an integer from 12 to 22;
n is an integer from 0 to 10;
p is 0 or 1; and
$X^+$ is $Li^+$, $Na^+$, $K^+$, $Cs^+$, $Ag^+$, or $(R^A)_4N^+$, wherein each occurrence of $R^A$ is selected from H, $C_{1-6}$ alkyl, $C_{3-6}$ cycloalkyl, 4- to 7-membered heterocycloalkyl, $C_{6-10}$ aryl, and 5- to 10-membered heteroaryl;
each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and
optionally, one or more instances of $R^A$ are taken together with the nitrogen atom to which they are attached to form a 4- to 7-membered heterocycloalkyl.

In some embodiments, the anionic surfactant includes a compound of Formula I. In some embodiments, the anionic surfactant includes a compound of Formula II. In some embodiments, the anionic surfactant includes a compound of Formula III.

In some embodiments, n, p, and q are each 0. In certain such embodiments, m is 12, 14, 16, 18, 20, or 22.

In some embodiments, n is from 1 to 10, and p is 1. In certain such embodiments, n is from 1 to 7, from 1 to 5, or from 1 to 3. In certain such embodiments, m is from 1 to 5, or from 1 to 3. In certain such embodiments, q is 10, 12, 14, 16, or 18.

Amine

The methods of the present disclosure including injecting a mixture including an amine through a wellbore into a high-permeability zone. In some embodiments, the amine includes an alkylene diamine, alkylene triamine, alkanolamine, or any combination thereof. In certain such embodiments, the alkylene diamine, alkylene triamine, or alkanolamine include a $C_2$-$C_6$ alkylene group. For example, in some embodiments, the amine includes diethylene triamine, bis(hexamethylene) triamine, 2-(dimethylamine) ethanol, or any combination thereof.

In some embodiments, the amine includes a compound of Formula IV:

(IV)

wherein
$R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;
$R^3$ and $R^4$ are each independently selected from —H, $C_{1-6}$ alkyl, $C_{3-6}$ Cycloalkyl, 4- to 7-membered heterocycloalkyl, $C_{6-10}$ aryl, and 5- to 10-membered heteroaryl;
each $C_{1-6}$ alkyl and $C_{6-10}$ aryl is optionally substituted with 1-3 $R^C$;
each $R^C$ is independently selected from —OH and —N($R^D$)$_2$; and
each $R^D$ is independently selected from —H and $C_{1-4}$ alkyl.

In some embodiments, $R^2$ is $C_{1-6}$ alkyl or phenyl. In some embodiments, $R^3$ and $R^4$ are each independently selected from —H, $C_{1-6}$ alkyl, and phenyl. In some embodiments, each $R^C$ is independently selected from —OH and —NH$_2$.

Mixture

The methods of the present disclosure including injecting a mixture including an anionic surfactant and an amine through a wellbore into a high-permeability zone. The anionic surfactant can be any anionic surfactant of the present disclosure. The amine can be any amine of the present disclosure. For example, in some embodiments, the mixture includes one or more anionic surfactants selected from sodium dodecyl sulfate, sodium tetradecyl sulfate, sodium hexadecyl sulfate, and sodium octadecyl sulfate, and one or more amines selected from diethylene triamine, bis(hexamethylene) triamine, and 2-(dimethylamino) ethanol.

In some embodiments, the anionic surfactant and the amine are present in the mixture in a molar ratio of about 5:1 to about 1:5, for example, about 5:1 to about 1:3, about 5:1 to about 1:2, about 5:1 to about 1:1, about 3:1 to about 1:5, about 3:1 to about 1:3, about 3:1 to about 1:2, about 3:1 to about 1:1, about 2:1 to about 1:5, about 2:1 to about 1:3, about 2:1 to about 1:2, about 2:1 to about 1:1. In some embodiments, the anionic surfactant and the amine are present in the mixture in a molar ratio of about 3:1, about 2:1, about 1:1, about 1:2, or about 1:3.

In some embodiments, the mixture before injecting through the wellbore includes water. The amount of water present in the mixture before injecting can be selected to provide a desired concentration of the anionic surfactant and the amine in the high-permeability zone after injecting the mixture. For example, an appropriate amount of a concentrated mixture can be injected into a high-permeability zone to provide, upon dilution with water present in the high-permeability zone, a desired concentration of the anionic surfactant and the amine in the high-permeability zone. Such amounts can be optimized for a given high-permeability zone, for example, using software.

Enhanced Oil Recovery Methods

Figure 1:
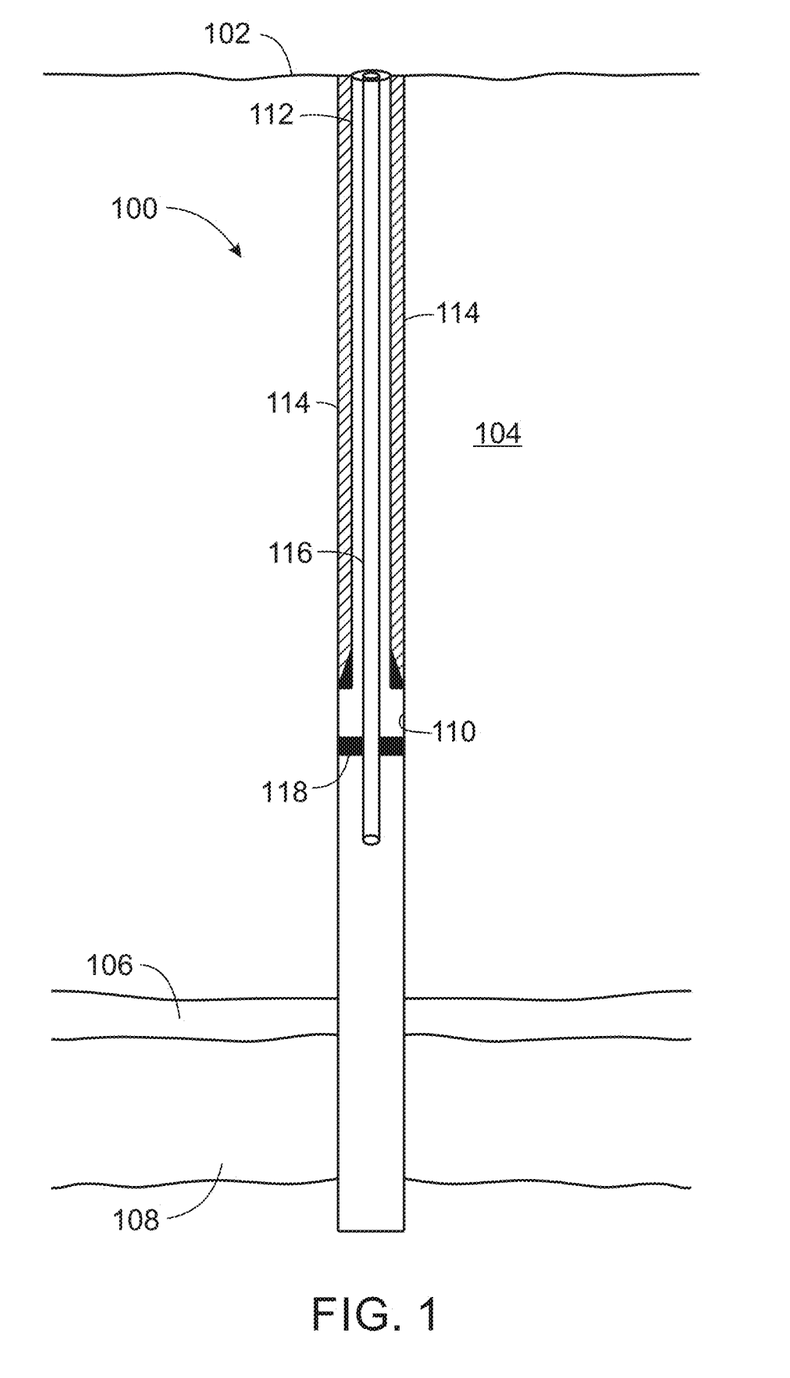
FIG. 1 is a schematic illustration of a wellbore formed through the earth surface into a subterranean formation.

The methods of the present disclosure include injecting a mixture including an anionic surfactant and an amine through a wellbore into a high-permeability zone of subterranean formation, and then injecting $CO_2$ through the wellbore into the high-permeability zone to increase a viscosity of the mixture in the high-permeability zone. FIG. 1 is a schematic illustration of a wellbore 100 formed through the earth surface 102 into a subterranean formation 104. The subterranean formation includes a high-permeability zone 106 and a low-permeability zone 108. An inner surface of the wellbore 100 is the formation surface 110 of the subterranean formation 104. In the illustrated embodiment, a portion of the wellbore 100 has a casing 112 with cement 114 disposed between the casing 112 and the formation surface 110. The wellbore 100 has a production tubing 116 (through a production packer 118) for the flow of produced fluid including a hydrocarbon to the surface 102. The hydrocarbon can be crude oil or natural gas that enters the wellbore 100 from the hydrocarbon reservoir formations 102.

In some embodiments, injecting the mixture includes pumping the mixture through the wellbore into the high-permeability zone. In some embodiments, injecting $CO_2$ includes pumping $CO_2$ through the wellbore into the high-permeability zone.

In some embodiments, the high-permeability zone is not mechanically isolated, and the mixture pumped through the wellbore preferentially flows into the high-permeability zone. In some embodiments, the high-permeability zone is not mechanically isolated, and $CO_2$ is continuously pumped through the wellbore after injecting the mixture, both to increase the viscosity of the mixture in the high permeability zone and to stimulate a flow of hydrocarbons from the low-permeability zone. In such embodiments, $CO_2$ pumped though the wellbore preferentially flows into the mixture-containing high-permeability zone until the viscosity of the mixture is increased due to gelation of the mixture in the high-permeability zone, after which $CO_2$ pumped through the wellbore preferentially flows into the low-permeability zone, stimulating hydrocarbon flow.

Figure 2:
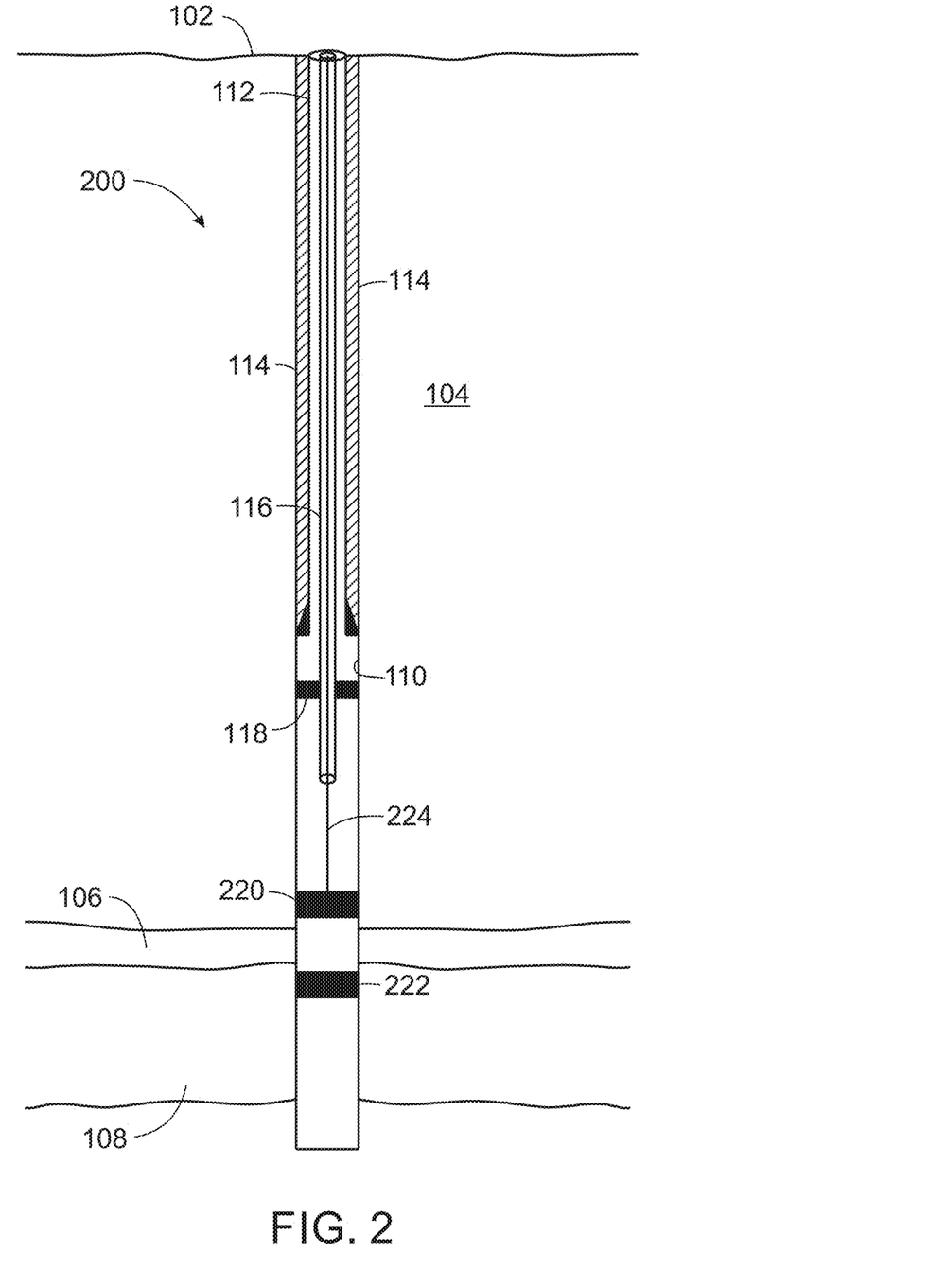
FIG. 2 is a schematic illustration of a wellbore formed through the earth surface into a subterranean formation.

In some embodiments, the method includes mechanically isolating the high-permeability zone before injecting the mixture. FIG. 2 is a schematic illustration of a wellbore 200 corresponding to wellbore 100 of FIG. 1, but further including upper packer 220 and lower packer 222 to mechanically isolate the high-permeability zone 106. In the illustrated embodiment, the mixture can be pumped through tubing 224, through a nozzle (not shown) in upper packer 220, into the isolated high-permeability zone 106, and then $CO_2$ can be pumped through tubing 224, through a nozzle (not shown) in upper packer 220, into the isolated high-permeability zone 106, to increase a viscosity of the mixture in the isolated high-permeability zone 106, by gelling the mixture in the isolated high-permeability zone 106. After increasing the viscosity of the mixture in the isolated high-permeability zone 106, subsequent $CO_2$ pumped into the wellbore, for example after removal of upper packer 220 and lower packer 222, can preferentially flow into low-permeability zone 108, stimulating hydrocarbon flow.

In some embodiments, isolating the high-permeability zone includes deploying a straddle packer into the wellbore. The straddle packer can include an upper expandable seal and a lower expandable seal to mechanically isolate the high-permeability zone, and nozzles to inject the mixture and the $CO_2$ into the isolated high-permeability zone to increase a viscosity of the mixture in the high-permeability zone. After increasing the viscosity of the mixture, the straddle packer can be removed from the wellbore, and $CO_2$ can be injected through the wellbore into the low-permeability zone to stimulate a flow of hydrocarbons therefrom.

Figure 3:
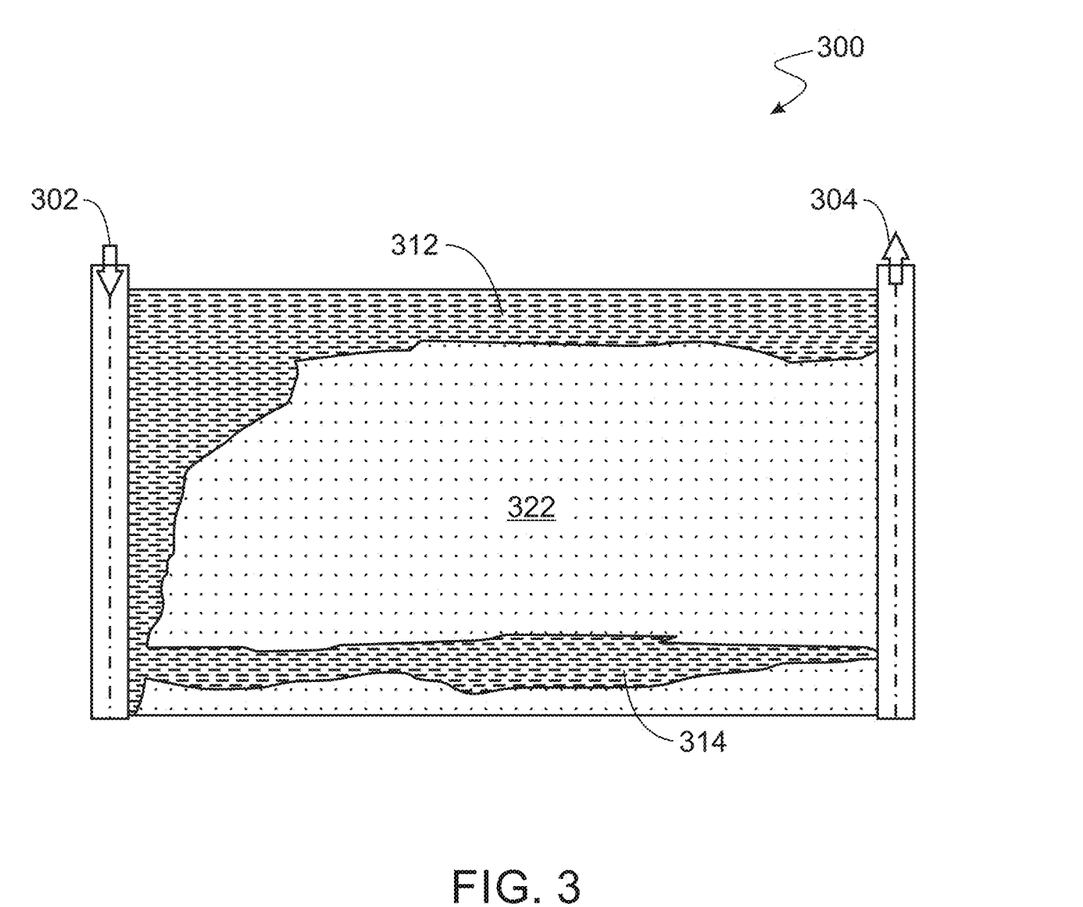
FIG. 3 is a schematic illustration of a subterranean formation.

In some embodiments, the high-permeability zone is the result of gravity override of $CO_2$ previously injected into the wellbore. In some embodiments, the high-permeability zone is the result of viscous fingering of $CO_2$ previously injected into the wellbore. In some embodiments, the low-permeability zone includes unswept hydrocarbons remaining after one or more previous fluid or gas injections. For example, FIG. 3 is a schematic illustration of a subterranean formation 300 following previous $CO_2$ injection. Subterranean formation 300 includes high-permeability zones 312 and 314 resulting from gravity override and viscous fingering of previously injected $CO_2$, respectively, and low-permeability zone 322, unswept by previously injected $CO_2$. In the illustrated embodiment, the mixture can be pumped through injection well 302 into high-permeability zones 312 and 314, and then $CO_2$ can be pumped through injection well 302 into high-permeability zones 312 and 314 to increase the viscosity of the mixture, and into low-permeability zone 322 to stimulate a flow of hydrocarbons (not shown) towards production well 304.

In some embodiments, a total concentration of the anionic surfactant and the amine in the high-permeability zone after injecting the mixture is about 0.01 mol/L to about 2 mol/L, for example, about 0.01 mol/L to about 1.5 mol/L, about 0.01 mol/L to about 1 mol/L, about 0.01 mol/L to about 0.75 mol/L, about 0.01 mol/L to about 0.5 mol/L, about 0.05 mol/L to about 2 mol/L, about 0.05 mol/L to about 1.5 mol/L, about 0.05 mol/L to about 1 mol/L, about 0.05 mol/L to about 0.75 mol/L, about 0.05 mol/L to about 0.5 mol/L, about 0.1 mol/L to about 2 mol/L, about 0.1 mol/L to about 1.5 mol/L, about 0.1 mol/L to about 1 mol/L, about 0.1 mol/L to about 0.75 mol/L, about 0.1 mol/L to about 0.5 mol/L, about 0.25 mol/L to about 2 mol/L, about 0.25 mol/L to about 1.5 mol/L, about 0.25 mol/L to about 1 mol/L, or about 0.25 mol/L to about 0.75 mol/L. In some embodiments, a total concentration of the anionic surfactant and the amine in the high-permeability zone after injecting the mixture is about 0.25 mol/L, about 0.5 mol/L, about 0.75 mol/L, about 1 mol/L, about 1.25 mol/L, or about 1.5 mol/L.

Before injecting the $CO_2$, the mixture can be a low-viscosity mixture. For example, in some embodiments, the viscosity of the mixture before injecting $CO_2$ is less than about 0.01 Pa·s at a shear rate from about 0.1 to about 1000 $s^{-1}$, for example, less than about 0.005, less than about 0.004, less than about 0.003, or less than about 0.002 Pa·s at a shear rate from about 0.1 to about 1000 $s^{-1}$.

Injecting the $CO_2$ can increase the viscosity of the mixture by triggering gelation of the mixture, for example, to yield a $CO_2$-stabilized gel including water and a cross-linked network of the anionic surfactant and the amine. In some embodiments, injecting the $CO_2$ increases the viscosity of the mixture in the high-permeability zone to greater than 0.005 Pa·s at a shear rate from about 0.1 to about 1000 $s^{-1}$, for example, greater than about 0.006 Pa·s, greater than about 0.007 Pa·s, or greater than about 0.008 Pa·s at a shear rate from about 0.1 to about 1000 $s^{-1}$. In some embodiments, injecting the $CO_2$ increases the viscosity of the mixture in the high-permeability zone to greater than 0.1 Pa·s at a shear rate from about 0.1 to about 10 $s^{-1}$. In some embodiments, injecting the $CO_2$ increases the viscosity of the mixture in the high-permeability zone to greater than 0.5 Pa·s at a shear rate from about 0.1 to about 1 $s^{-1}$.

Figure 4:
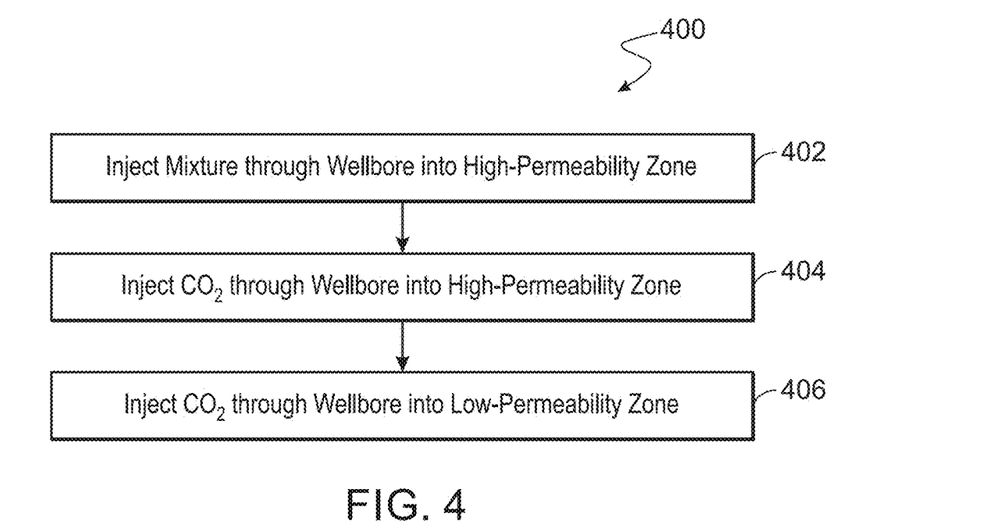
FIG. 4 is a block flow diagram of a method for EOR from a subterranean formation.

FIG. 4 is a process flow diagram of a method 400 for EOR from a subterranean formation. The method starts at block 402 with the injection of a mixture including an anionic surfactant and an amine through a wellbore into the high-permeability zone. At block 404 of the method, $CO_2$ is injected through the wellbore into the high-permeability zone to increase a viscosity of the mixture in the high-permeability zone. At block 406 of the method, $CO_2$ is injected through the wellbore into the low-permeability zone to stimulate a flow of hydrocarbons from the low-permeability zone.

Figure 5:
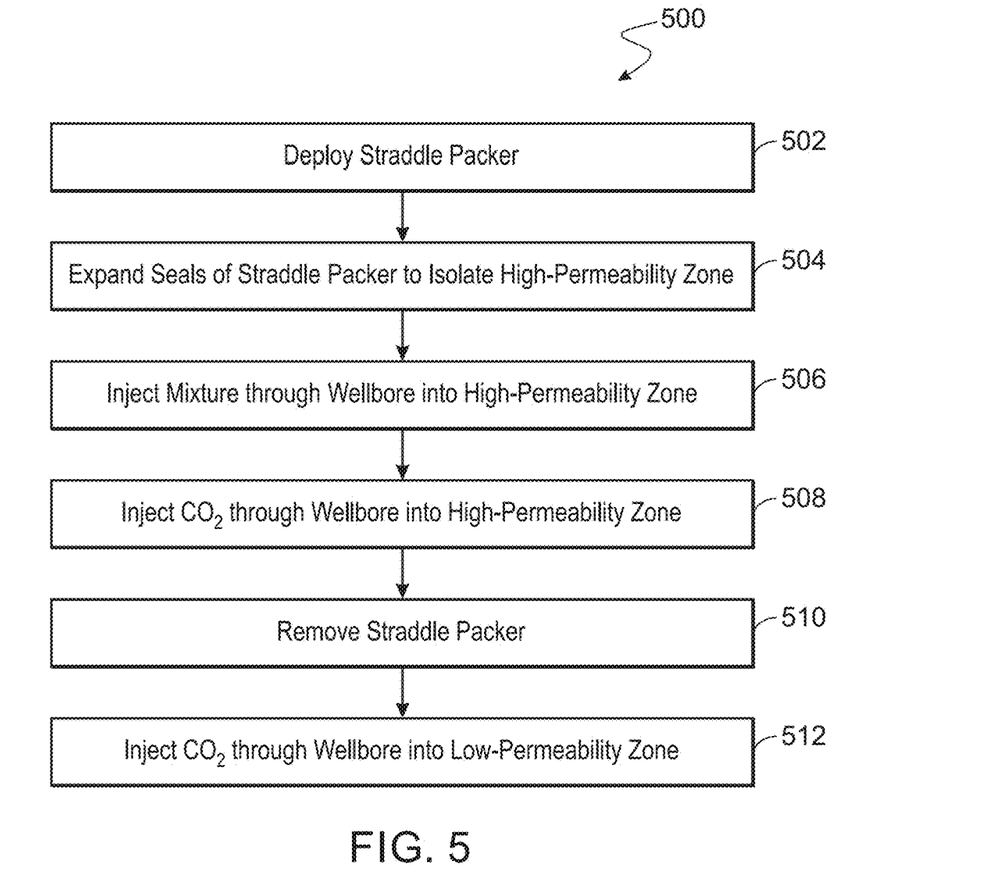
FIG. 5 is a block flow diagram of a method for EOR from a subterranean formation.

FIG. 5 is a process flow diagram of a method 500 for EOR from a subterranean formation. The method starts at block 502 with the deployment of a straddle packer into a wellbore in the subterranean formation. At block 504 of the method, an upper seal of the straddle packer is expanded above the high-permeability zone and a lower seal of the straddle packer is expanded below the high-permeability zone to mechanically isolate the high-permeability zone. At block 506 of the method, a mixture including an anionic surfactant and an amine is injected through the straddle packer into the high-permeability zone. At block 508 of the method, $CO_2$ is injected through the straddle packer into the high-permeability zone to increase a viscosity of the mixture in the high-permeability zone. At block 510 of the method, the straddle packer is removed from the wellbore. At block 512 of the method, $CO_2$ is injected through the wellbore into the low-permeability zone to stimulate a flow of hydrocarbons from the low-permeability zone.

EXAMPLES

Example 1. $CO_2$-Triggered Gelation of Anionic Surfactant-Amine Mixtures

Aqueous solutions of an anionic surfactant and an amine were prepared according to Table 1 to provide Mixtures 1-4.

TABLE 1

| Mixture | Anionic Surfactant | Amine |
|---|---|---|
| 1 | 0.25 mol/L sodium dodecyl sulfate (SDS) | 0.25 mol/L diethylenetriamine (DETA) |
| 2 | 0.25 mol/L sodium tetradecyl sulfate (STS) | 0.25 mol/L DETA |
| 3 | 0.25 mol/L sodium hexadecyl sulfate (SHS) | 0.25 mol/L DETA |
| 4 | 0.25 mol/L sodium octadecyl sulfate (SOS) | 0.25 mol/L DETA |

Figure 6A:
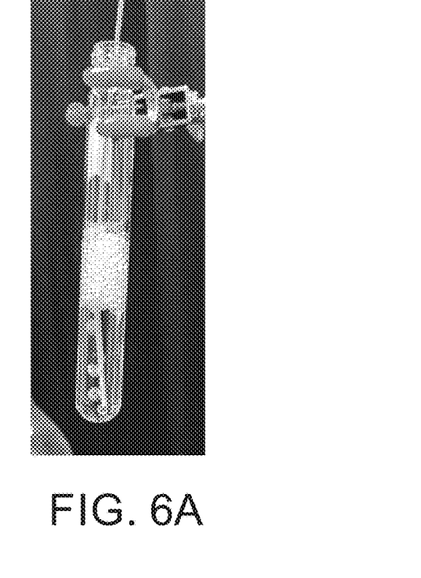
FIG. 6A is a photograph of a mixture of the present disclosure before exposure to $CO_2$.
Figure 6B:
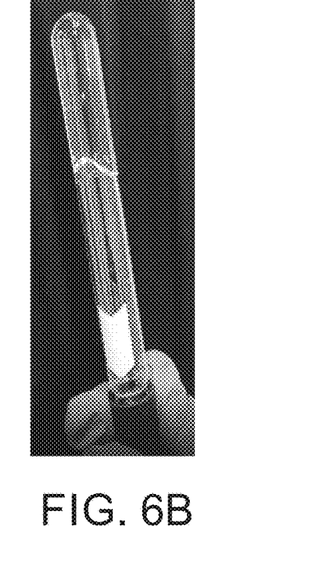
FIG. 6B is a photograph of a mixture of the present disclosure after exposure to $CO_2$.
Figure 7:
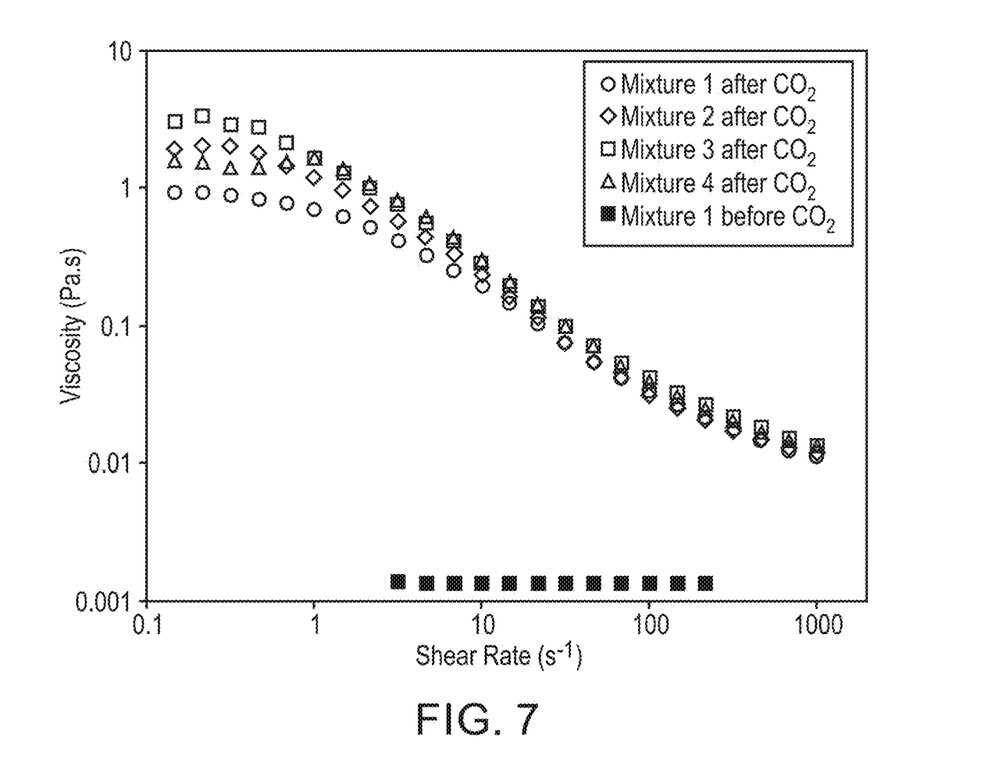
FIG. 7 is a graph comparing the viscosity of certain mixtures of the present disclosure before and after exposure to $CO_2$.

$CO_2$ was bubbled through each of Mixtures 1-4 to trigger gelation. FIGS. 6A-B are photographs showing Mixture 1 before (6A) and after (6B) exposure to $CO_2$. Rheological properties of the gelled samples were determined at 25° C. using a TA controlled-stress rheometer (TA Instruments-Waters LLC) equipped with a setup of parallel plates. Rheological properties of Mixture 1 before $CO_2$ exposure were measured using a setup of double wall concentric cylinders. The shear rate ranged from 0.1 to 1000 $s^{-1}$. As shown in FIG. 7, injection of $CO_2$ significantly increased the viscosity of Mixtures 1-4.

EMBODIMENTS

Certain embodiments of the present disclosure are provided in the following list:

Embodiment 1. A method of enhanced oil recovery (EOR) from a subterranean formation comprising a high-permeability zone and a low-permeability zone, the method comprising:
injecting, through a wellbore into the high-permeability zone, a mixture comprising an anionic surfactant and an amine and having a viscosity of less than about 0.01 Pa·s at a shear rate from about 0.1 to about 1000 $s^{-1}$;
injecting $CO_2$ through the wellbore into the high-permeability zone to increase a viscosity of the mixture in the high-permeability zone, wherein increasing the viscosity of the mixture reduces a mobility of $CO_2$ in the high-permeability zone; and
injecting $CO_2$ through the wellbore into the low-permeability zone to stimulate a flow of hydrocarbons from the low-permeability zone.

Embodiment 2. The method of embodiment 1, wherein the anionic surfactant comprises a carboxylate surfactant, a sulfonate surfactant, a sulfate surfactant, or any combination thereof.

Embodiment 3. The method of embodiment 1 or embodiment 2, wherein the anionic surfactant comprises an alkyl group, an alkenyl group, or an alkyl alcohol ether group.

Embodiment 4. The method of embodiment 3, wherein the alkyl group comprises a $C_{12-22}$ alkyl group.

Embodiment 5. The method of embodiment 3, wherein the alkyl group comprises a $C_{12-22}$ alkenyl group.

Embodiment 6. The method of embodiment 3, wherein the alkyl alcohol ether group comprises a $C_{12-22}$ alkyl alcohol polyoxyethylene group.

Embodiment 7. The method of embodiment 1 or embodiment 2, wherein the anionic surfactant comprises a compound of Formula I, Formula II, or Formula III:

-continued (II)

(III)

wherein:
R¹ is the sum of m and q is an integer from 12 to 22;
n is an integer from 0 to 10;
p is 0 or 1; and
$X^+$ is $Li^+$, $Na^+$, $K^+$, $Cs^+$, $Ag^+$, or $(R^A)_4N^+$, wherein
each occurrence of $R^A$ is selected from H, $C_{1-6}$ alkyl, $C_{3-6}$ cycloalkyl, 4- to 7-membered heterocycloalkyl, $C_{6-10}$ aryl, and 5- to 10-membered heteroaryl;
each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and
optionally, one or more instances of $R^A$ are taken together with the nitrogen atom to which they are attached to form a 4- to 7-membered heterocycloalkyl.

Embodiment 8. The method of embodiment 7, wherein
n is from 1 to 10; and
p is 1.

Embodiment 9. The method of embodiment 7, wherein n, p, and q are each 0.

Embodiment 10. The method of embodiment 1 or embodiment 2, wherein the anionic surfactant comprises sodium dodecyl sulfate, sodium tetradecyl sulfate, sodium hexadecyl sulfate, sodium octadecyl sulfate, or any combination thereof.

Embodiment 11. The method of any one of embodiments 1-10, wherein the amine comprises an alkylene diamine, alkylene triamine, alkanolamine, or any combination thereof.

Embodiment 12. The method of any one of embodiments 1-10, wherein the amine comprises a compound of Formula IV:

(IV)

wherein
$R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;
$R^3$ and $R^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;

each $C_{1-6}$ alkyl and $C_{6-10}$ aryl is optionally substituted with 1-3 $R^C$;
each $R^C$ is independently selected from —OH and —N($R^D$)$_2$; and
each $R^D$ is independently selected from —H and $C_{1-4}$ alkyl.

Embodiment 13. The method of embodiment 12, wherein
$R^2$ is $C_{1-6}$ alkyl or phenyl;
$R^3$ and $R^4$ are each independently selected from —H, $C_{1-6}$ alkyl, and phenyl; and
each $R^C$ is independently selected from —OH and —NH$_2$.

Embodiment 14. The method of any one of embodiments 1-10, wherein the amine comprises diethylene triamine, bis(hexamethylene)triamine, 2-(dimethylamino)ethanol, or any combination thereof.

Embodiment 15. The method of any one of embodiments 1-14, wherein the anionic surfactant and the amine are present in the mixture in a molar ratio of about 5:1 to about 1:5.

Embodiment 16. The method of any one of embodiments 1-14, wherein the anionic surfactant and the amine are present in the mixture in a molar ratio of about 2:1 to about 1:2.

Embodiment 17. The method of any one of embodiments 1-16, wherein a total concentration of the anionic surfactant and the amine in the high-permeability zone after injecting the mixture is about 0.01 mol/L to about 2 mol/L.

Embodiment 18. The method of any one of embodiments 1-16, wherein a total concentration of the anionic surfactant and the amine in the high-permeability zone after injecting the mixture is about 0.1 mol/L to about 0.75 mol/L.

Embodiment 19. The method of any one of embodiments 1-18, wherein the viscosity of the mixture before injecting CO$_2$ is less than about 0.005 Pa·s at a shear rate from about 0.1 to about 1000 s$^{-1}$.

Embodiment 20. The method of any one of embodiments 1-19, wherein injecting CO$_2$ increases the viscosity of the mixture in the high-permeability zone to greater than about 0.01 Pa·s at a shear rate from about 0.1 to about 1000 s$^{-1}$.

Embodiment 21. The method of any one of embodiments 1-20, wherein a depth of the low-permeability zone is greater than a depth of the high-permeability zone.

Embodiment 22. A method of enhanced oil recovery (EOR) from a subterranean formation comprising a high-permeability zone and a low-permeability zone, the method comprising:
expanding an upper seal of the straddle packer above the high-permeability zone and expanding a lower seal of the straddle packer below the high-permeability zone to mechanically isolate the high-permeability zone;
injecting a mixture comprising an anionic surfactant and an amine through the straddle packer into the high-permeability zone;
injecting CO$_2$ through the wellbore into the high-permeability zone to increase a viscosity of the mixture in the high-permeability zone, wherein increasing the viscosity of the mixture reduces a mobility of CO$_2$ in the high-permeability zone;
removing the straddle packer from the wellbore after increasing the viscosity of the mixture; and injecting $CO_2$ through the wellbore into the low-permeability zone to stimulate a flow of hydrocarbons from the low-permeability zone.

Other implementations are also within the scope of the following claims.

What is claimed is:

1. A method of enhanced oil recovery (EOR) from a subterranean formation comprising a high-permeability zone and a low-permeability zone, the method comprising:

injecting, through a wellbore into the high-permeability zone, a mixture comprising an anionic surfactant and an amine and having a viscosity of less than about 0.01 Pa·s at a shear rate from about 0.1 to about 1000 s$^{-1}$;

injecting $CO_2$ through the wellbore into the high-permeability zone to increase a viscosity of the mixture in the high-permeability zone, wherein increasing the viscosity of the mixture reduces a mobility of $CO_2$ in the high-permeability zone; and injecting $CO_2$ through the wellbore into the low-permeability zone to stimulate a flow of hydrocarbons from the low-permeability zone.

2. The method of claim 1, wherein the anionic surfactant comprises a carboxylate surfactant, a sulfonate surfactant, a sulfate surfactant, or any combination thereof.

3. The method of claim 2, wherein the anionic surfactant comprises an alkyl group, an alkenyl group, or an alkyl alcohol ether group.

4. The method of claim 3, wherein the alkyl group comprises a $C_{12-22}$ alkyl group.

5. The method of claim 3, wherein the alkyl group comprises a $C_{12-22}$ alkenyl group.

6. The method of claim 3, wherein the alkyl alcohol ether group comprises a $C_{12-22}$ alkyl alcohol polyoxyethylene group.

7. The method of claim 2, wherein the anionic surfactant comprises a compound of Formula I, Formula II, or Formula III:

wherein:
$R^1$ is the sum of m and q is an integer from 12 to 22;
n is an integer from 0 to 10;
p is 0 or 1; and
$X^+$ is $Li^+$, $Na^+$, $K^+$, $Cs^+$, $Ag^+$, or $(R^A)_4N^+$, wherein each occurrence of $R^A$ is selected from H, $C_{1-6}$ alkyl, $C_{3-6}$ cycloalkyl, 4- to 7-membered heterocycloalkyl, $C_{6-10}$ aryl, and 5- to 10-membered heteroaryl;

each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and optionally, one or more instances of $R^A$ are taken together with the nitrogen atom to which they are attached to form a 4- to 7-membered heterocycloalkyl.

8. The method of claim 7, wherein
n is from 1 to 10; and
p is 1.

9. The method of claim 7, wherein n, p, and q are each 0.

10. The method of claim 2, wherein the anionic surfactant comprises sodium dodecyl sulfate, sodium tetradecyl sulfate, sodium hexadecyl sulfate, sodium octadecyl sulfate, or any combination thereof.

11. The method of claim 1, wherein the amine comprises an alkylene diamine, alkylene triamine, alkanolamine, or any combination thereof.

12. The method of claim 1, wherein the amine comprises a compound of Formula IV:

wherein
$R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;

$R^3$ and $R^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;

each $C_{1-6}$ alkyl and $C_{6-10}$ aryl is optionally substituted with 1-3 $R^C$;

each $R^C$ is independently selected from —OH and —N($R^D$)$_2$; and each $R^D$ is independently selected from —H and $C_{1-4}$ alkyl.

13. The method of claim 12, wherein
$R^2$ is $C_{1-6}$ alkyl or phenyl;
$R^3$ and $R^4$ are each independently selected from —H, $C_{1-6}$ alkyl, and phenyl; and
each $R^C$ is independently selected from —OH and —NH$_2$.

14. The method of claim 1, wherein the amine comprises diethylene triamine, bis(hexamethylene)triamine, 2-(dimethylamino)ethanol, or any combination thereof.

15. The method of claim 1, wherein the anionic surfactant and the amine are present in the mixture in a molar ratio of about 5:1 to about 1:5.

16. The method of claim 1, wherein the anionic surfactant and the amine are present in the mixture in a molar ratio of about 2:1 to about 1:2.

17. The method of claim 1, wherein a total concentration of the anionic surfactant and the amine in the high-permeability zone after injecting the mixture is about 0.01 mol/L to about 2 mol/L.

18. The method of claim 1, wherein a total concentration of the anionic surfactant and the amine in the high-permeability zone after injecting the mixture is about 0.1 mol/L to about 0.75 mol/L.

19. The method of claim 1, wherein the viscosity of the mixture before injecting $CO_2$ is less than about 0.005 Pa·s at a shear rate from about 0.1 to about 1000 $s^{-1}$.

20. The method of claim 1, wherein injecting $CO_2$ increases the viscosity of the mixture in the high-permeability zone to greater than about 0.01 Pa·s at a shear rate from about 0.1 to about 1000 $s^{-1}$.

21. The method of claim 1, wherein a depth of the low-permeability zone is greater than a depth of the high-permeability zone.

22. A method of enhanced oil recovery (EOR) from a subterranean formation comprising a high-permeability zone and a low-permeability zone, the method comprising:
- expanding an upper seal of the straddle packer above the high-permeability zone and expanding a lower seal of the straddle packer below the high-permeability zone to mechanically isolate the high-permeability zone;
- injecting a mixture comprising an anionic surfactant and an amine through the straddle packer into the high-permeability zone;
- injecting $CO_2$ through the wellbore into the high-permeability zone to increase a viscosity of the mixture in the high-permeability zone, wherein increasing the viscosity of the mixture reduces a mobility of $CO_2$ in the high-permeability zone;
- removing the straddle packer from the wellbore after increasing the viscosity of the mixture; and
- injecting $CO_2$ through the wellbore into the low-permeability zone to stimulate a flow of hydrocarbons from the low-permeability zone.

* * * * *